E. R. PENDLETON.
VEHICLE ATTACHMENT.
APPLICATION FILED JUNE 17, 1919.
1,358,650.
Patented Nov. 9, 1920.
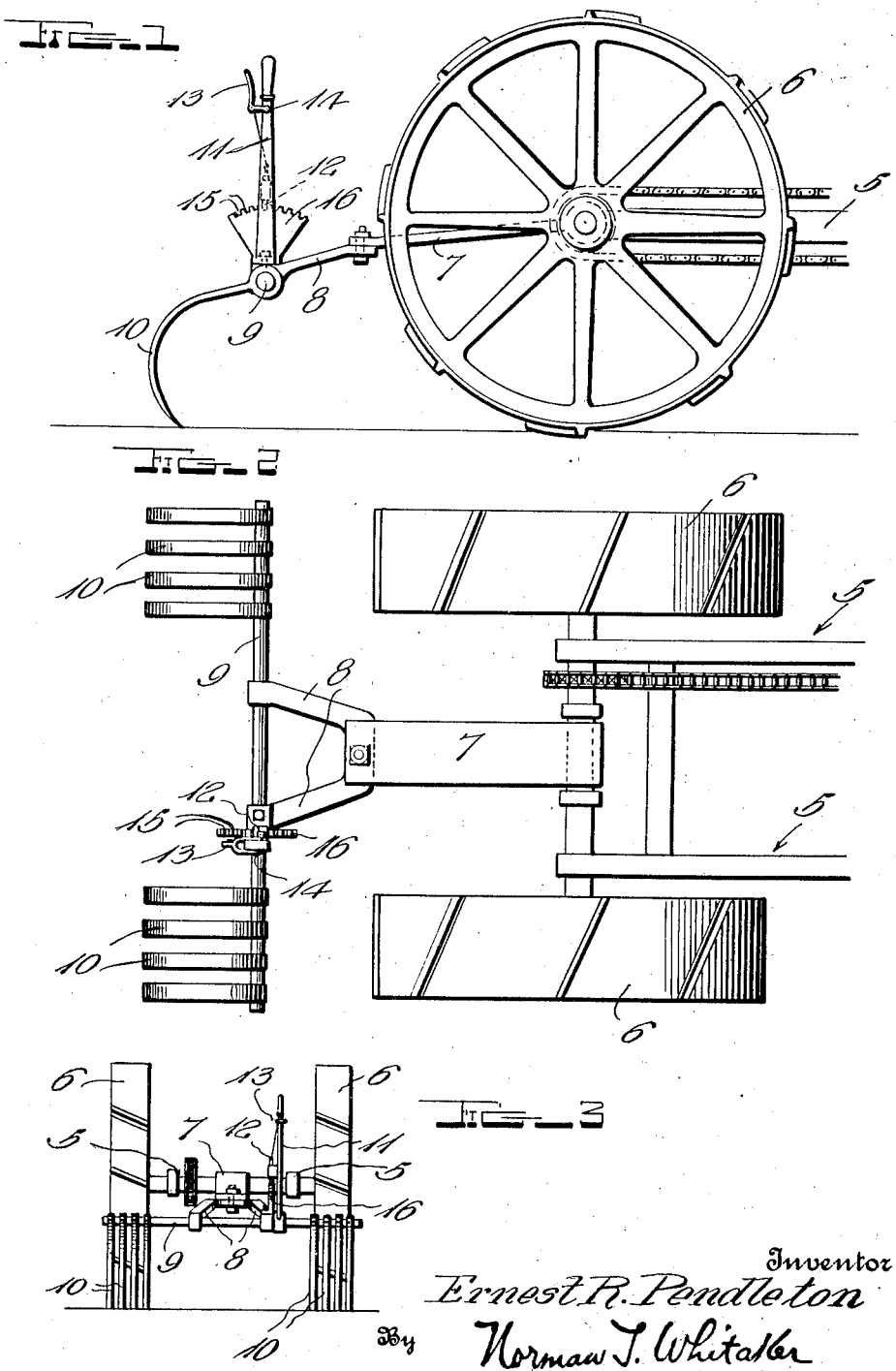

UNITED STATES PATENT OFFICE.

ERNEST RAYMOND PENDLETON, OF CLEVELAND, OHIO.

VEHICLE ATTACHMENT.

1,358,650.  Specification of Letters Patent.  Patented Nov. 9, 1920.

Application filed June 17, 1919. Serial No. 304,823.

*To all whom it may concern:*

Be it known that I, ERNEST RAYMOND PENDLETON, a citizen of the United States, and a resident of Cleveland, in the county of Cuyahoga and State of Ohio, have invented new and useful Improvements in Vehicle Attachments, of which the following is a specification.

This invention relates to tractor attachments and has for its primary object the provision of a means whereby the soil which has been compressed as a result of the passage of the tractor wheels thereover may be loosened.

A further object of the invention is to provide in an attachment of the above mentioned character a means whereby the device as a whole may be rigidly attached to the tractor and used in connection therewith without hindering or preventing the attachment of any earth working implement such as cultivators, plows or the like which are drawn by farm tractors.

A further object of the invention is to provide in an attachment of the above mentioned character a means whereby the earth working elements may be raised or lowered to any predetermined height or depth to loosen the compressed soil in the path of the tractor wheels to any desired depth.

Other objects and advantages of the intion will be apparent during the course of the following description taken in connection with the accompanying drawings.

In the drawings, forming a part of this specification and wherein like numerals are employed to designate like parts throughout the same, Figure 1 is a side elevation of the attachment embodying my invention, the attachment being shown as connected to a tractor, Fig. 2 is a top plan view of the attachment shown in Fig. 1, and, Fig. 3 is a rear elevation of the attachment embodying my invention, the attachment being shown as secured to a tractor.

In the drawings, wherein for the purpose of illustration is shown a preferred form of my invention, the numeral 5 indicates as a whole the frame or chassis of a power driven tractor having traction wheels 6 which are adapted to be driven by the power plant, not shown, of the tractor. The tractor is provided with a conventional type of draw bar 7 to which is rigidly secured a pair of arms 8 to which is journaled an elongated shaft 9 having preferably spring teeth 10 rigidly secured thereto at its end, the spring teeth at each end of the shaft 9 being in alinement with the tractor wheels 6 as shown. While I have shown the earth loosening elements 10 as spring teeth I wish it understood that if it should be deemed advisable disks or other similar elements may be substituted therefor without departing from the spirit of the invention. To the shaft 9 there is rigidly secured a hand lever 11 which is provided with a reciprocating pawl 12 actuated by means of an operable grip 13 pivotally connected to the hand lever 11 as shown at 14. The reciprocating pawl is adapted to engage any one of the several notches 15 provided by an arcuate shaped segment 16 which is rigidly secured to one of the arms 8 in order to retain the earth loosening elements or spring teeth 10 at any desired position. It is therefore apparent that by operating the hand lever 11 the compressed earth in the path of travel of the wheel 6 may be loosened to any desired depth. It is further understood that when it is not desired to use the earth loosening elements or spring teeth in the capacity for which they are primarily intended, they may be elevated to such a height and retained in this position to prevent engagement thereof with the earth when the tractor is being transported under its own power from one place to another and not functioning as a means for operating any earth working implements with which a tractor is particularly adapted to be used.

It is thought that the operation of the device as a whole may be readily understood from the above description by those who are skilled in the art to which the invention pertains and it is therefore deemed unnecessary to further describe the operation of the device.

It is to be understood that the form of my invention herewith shown and described is to be taken as a preferred example of the same, and that various changes in the shape, size and arrangement of parts may be resorted to without departing from the spirit of the invention or the scope of the subjoined claim.

Having thus described my invention, what I claim as new and desire to secure and protect by Letters Patent of the United States, is:

In a vehicle attachment, a draw bar adapted to be supported in a substantially horizontal plane centrally of the rear wheels of the vehicle, a pair of divergent arms carried by the outer end of the draw bar and formed with bearings at their outer ends, a rock shaft supported in the bearings and carrying a plurality of earth working elements, a toothed quadrant carried by one of the bearings and a lever fixed to the rock shaft, and a locking dog carried by the lever for engagement with the tooth quadrant to lock the shaft in any axial position.

ERNEST RAYMOND PENDLETON.